United States Patent
Ashizawa et al.

(10) Patent No.: US 12,241,811 B2
(45) Date of Patent: Mar. 4, 2025

(54) LIQUID LEAKAGE DETECTOR FOR DETECTING LIQUID LEAKAGE

(71) Applicant: TATSUTA ELECTRIC WIRE & CABLE CO., LTD., Osaka (JP)

(72) Inventors: Tsutomu Ashizawa, Osaka (JP); Yoshio Hirano, Osaka (JP)

(73) Assignee: TATSUTA ELECTRIC WIRE & CABLE CO., LTD., Higashiosaka (JP)

( * ) Notice: Subject to any disclaimer, the term of this patent is extended or adjusted under 35 U.S.C. 154(b) by 308 days.

(21) Appl. No.: 17/763,857

(22) PCT Filed: Apr. 15, 2020

(86) PCT No.: PCT/JP2020/016549
§ 371 (c)(1),
(2) Date: Mar. 25, 2022

(87) PCT Pub. No.: WO2021/065060
PCT Pub. Date: Apr. 8, 2021

(65) Prior Publication Data
US 2022/0341805 A1    Oct. 27, 2022

(30) Foreign Application Priority Data
Sep. 30, 2019  (JP) ................. 2019-179045

(51) Int. Cl.
*G01M 3/16* (2006.01)
(52) U.S. Cl.
CPC ................... *G01M 3/16* (2013.01)

(58) Field of Classification Search
CPC ........................................ G01M 3/16
See application file for complete search history.

(56) References Cited

U.S. PATENT DOCUMENTS

| | | | | |
|---|---|---|---|---|
| 4,918,977 A | * | 4/1990 | Takahashi | G01M 3/045 324/541 |
| 5,370,927 A | * | 12/1994 | Scholz | A61L 15/12 427/322 |
| 5,381,097 A | * | 1/1995 | Takatori | G01M 3/045 324/555 |
| 2008/0006338 A1 | * | 1/2008 | Wideman | F16L 11/081 138/124 |
| 2008/0210329 A1 | * | 9/2008 | Quigley | F16L 11/083 138/104 |
| 2010/0012004 A1 | * | 1/2010 | Telander | B32B 5/024 428/328 |

(Continued)

FOREIGN PATENT DOCUMENTS

| | | |
|---|---|---|
| CN | 109186896 A | 1/2019 |
| JP | H4328212 A | 11/1992 |

(Continued)

*Primary Examiner* — Eric S. McCall
(74) *Attorney, Agent, or Firm* — The Webb Law Firm (57) ABSTRACT

Provided is a liquid leakage detection line including: at least two conductors including a first conductor and a second conductor, in which the first conductor and the second conductor are configured to be electrically connected to each other through a liquid. Each of the first conductor and the second conductor is directly covered by a braid including basalt fibers, or the first conductor and the second conductor are indirectly covered by the braid.

3 Claims, 8 Drawing Sheets

(56) References Cited

U.S. PATENT DOCUMENTS

| | | | |
|---|---|---|---|
| 2014/0065332 A1* | 3/2014 | Hanusa | B32B 5/022 |
| | | | 442/268 |
| 2017/0198173 A1 | 7/2017 | Frigge et al. | |
| 2018/0246048 A1* | 8/2018 | Sakunenko | G01M 3/165 |
| 2019/0308345 A1* | 10/2019 | Matsumoto | D02G 3/402 |

FOREIGN PATENT DOCUMENTS

| | | |
|---|---|---|
| JP | H538547 U | 5/1993 |
| JP | H098042 A | 1/1997 |
| JP | 2015072168 A | 4/2015 |
| JP | 6208518 B2 | 9/2017 |
| JP | 2017179340 A | 10/2017 |

* cited by examiner

LIQUID LEAKAGE DETECTOR FOR DETECTING LIQUID LEAKAGE

CROSS-REFERENCE TO RELATED APPLICATIONS

This application is the United States national phase of International Application No. PCT/JP2020/016549 filed Apr. 15, 2020, and claims priority to Japanese Patent Application No. 2019-179045 filed Sep. 30, 2019, the disclosures of which are hereby incorporated by reference in their entirety.

BACKGROUND OF THE INVENTION

Field of the Invention

The present invention relates to a liquid leakage detection line.

Description of Related Art

Conventionally, liquid leakage detection lines are used to detect the leakage of, for example, water or chemical liquids in buildings or factories. Known as one of the liquid leakage detection lines is, for example, a liquid leakage detection line that includes a plurality of conductors including a first conductor and a second conductor, in which the first conductor and the second conductor are configured to be electrically connected to each other through a liquid.

There are some cases where the liquid leakage detection line is required to have flame retardancy. As a liquid leakage detection line having flame retardancy, proposed has been a liquid leakage detection line having each of the plurality of conductors covered by a braid formed of glass fibers that are inorganic fibers (Patent Literature 1).

CITATION LIST

Patent Literature

Patent Literature 1 JP 6208518 B

SUMMARY OF THE INVENTION

Technical Problem

When laid, the liquid leakage detection line is generally processed to have its conductors exposed by peeling off the braid for electrical connection with, for example, a liquid leakage detector. Further, the liquid leakage detection line is processed by being cut into such a length as to correspond to the size or shape of a location in a building, a factory, or the like where the liquid leakage detection line is laid. At the time of such processing, ends of fibers protrude from the cut part of the liquid leakage detection line, or fibers waste is generated out of the braid. Glass fibers frequently used for, for example, heat insulating materials are known to generate fiber waste that stings the skin of laying workers and gives the workers irritating discomfort. Therefore, when the braid of the liquid leakage detection line is formed of glass fibers, it is necessary to take measures for preventing the ends of the fibers from being exposed or fiber waste from being generated, or necessary to have workers securely wear protective equipment such as gloves, resulting in insufficient workability for the laying workers. That is, such a liquid leakage detection line including the braid formed of glass fibers that are inorganic fibers has an improved flame retardancy, but has a problem of poor construction workability.

In view of the above problems, it is an object of the present invention to provide a liquid leakage detection line having excellent flame retardancy and good construction workability.

Solution to Problem

A liquid leakage detection line according to the present invention includes: at least two conductors including a first conductor and a second conductor, in which the first conductor and the second conductor are configured to be electrically connected to each other through a liquid, and in which each of the first conductor and the second conductor is directly covered by a braid including basalt fibers, or the first conductor and the second conductor are indirectly covered by the braid.

It is preferable that the liquid leakage detection line further include: a support material supporting the first conductor and the second conductor, and that the first conductor and the second conductor be supported by the support material so as to be disposed in parallel with each other with a clearance therebetween.

The liquid leakage detection line is preferably configured such that the braid includes a first braid directly covering the first conductor, and a second braid directly covering the second conductor, and that the first braid and the second braid are supported by the support material so as to be disposed in parallel with each other with the clearance therebetween.

The liquid leakage detection line is preferably configured such that both of the first conductor and the second conductor are covered by the single braid, and that at least one of the first conductor and the second conductor is further covered by a covering material through which the liquid can pass.

The liquid leakage detection line is preferably configured such that one of the first conductor and the second conductor is not covered by the covering material.

DESCRIPTION OF THE INVENTION

A description will be hereinafter given on a liquid leakage detection line according to an embodiment of the present invention, with reference to the drawings.

Figure 1:
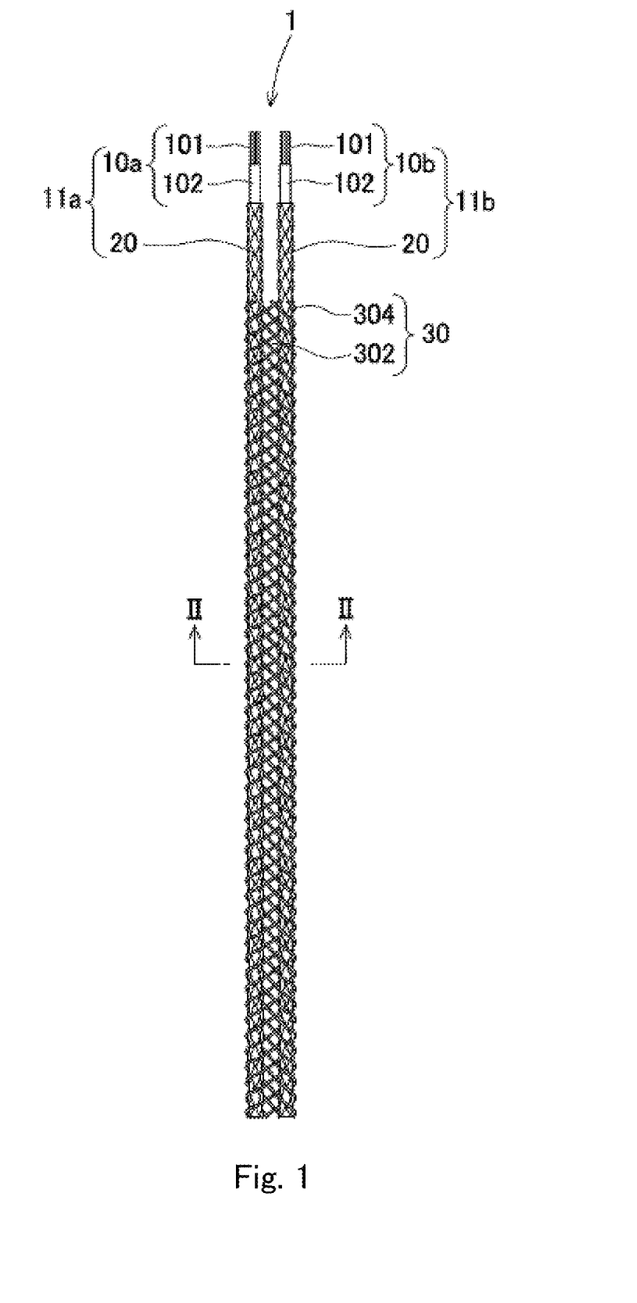
FIG. 1 is a plan view of a liquid leakage detection line according to a first embodiment.
Figure 2:
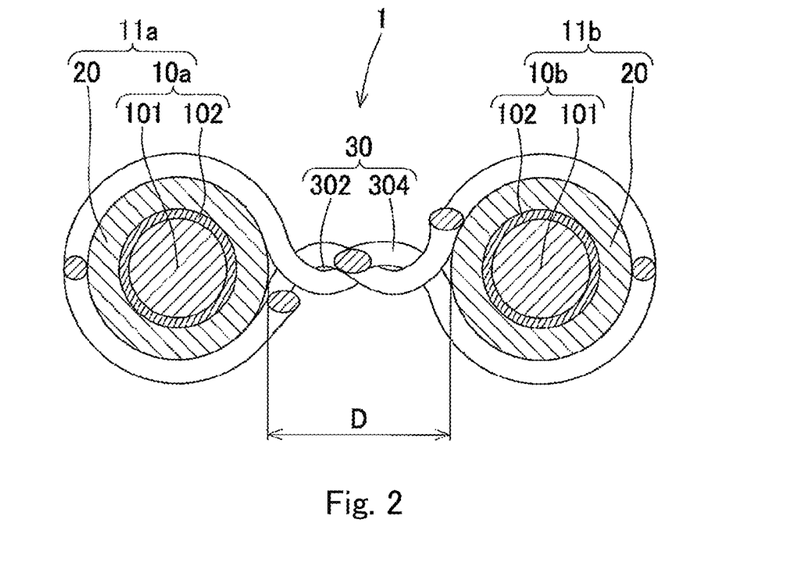
FIG. 2 is a sectional view of the liquid leakage detection line taken along line II-II in FIG. 1.

A leakage detection line 1 according to a first embodiment shown in FIG. 1 and FIG. 2 includes a first conductor 10a, a second conductor 10b, and a braid 20 that directly covers each of the conductors. That is, each of the first conductor 10a and the second conductor 10b is separately covered by the braid 20. The first conductor 10a and the second conductor 10b are arranged in the liquid leakage detection line 1 to be configured to be electrically connected to each other through a liquid L to cause change in their conduction state so that the presence of the liquid L is detected. That is, the first conductor 10a and the second conductor 10b are members that respectively form a first electrode wire 11a and a second electrode wire 11b forming a pair in the liquid leakage detection line 1. The first electrode wire 11a includes, as an essential member, the first conductor 10a, and includes, as an optional member, a first braid 20 covering the first conductor 10a. Similarly, the second electrode wire 11b includes, as an essential member, the second conductor 10b, and includes, as an optional member, a second braid 20 covering the second conductor 10b. The first electrode wire 11a and the second electrode wire 11b are supported by a support material 30 formed into a net shape so as to be disposed in parallel with each other with a clearance D therebetween. Accordingly, the liquid leakage detection line 1 is configured to cause the liquid L to be transmitted along the support material 30 and absorbed by the braids 20, to thereby electrically connect the first conductor 10a and the second conductor 10b to each other through the liquid L.

In this embodiment, each of the first conductor 10a and the second conductor 10b includes a copper wire 101, and a conductive resin layer 102 formed on an outer side of the copper wire 101.

The copper wire 101 is formed by twisting a plurality of annealed copper element wires. The copper wire 101 has a cross-sectional area generally set to 0.1 to 1.0 mm$^2$.

The conductive resin layer 102 is formed of a resin in which a conductive substance such as carbon is dispersed. As a resin for forming the conductive resin layer 102, a fluorine-based resin is preferable. Examples of the fluorine-based resin include a tetrafluoroethylene-hexafluoropropylene copolymer (FEP), an ethylene-tetrafluoroethylene copolymer (ETFE), a tetrafluoroethylene-perfluoroalkoxyethylene copolymer (PFA), and a tetrafluoroethylene resin (PTFE). The conductive resin layer 102 has a thickness generally set to 0.04 to 0.15 μm.

As shown in FIG. 2, the clearance D between the first braid 20 forming the first electrode wire 11a and the second braid 20 forming the second electrode wire 11b is set to generally 2.0 to 5.0 mm, preferably 2.5 to 4.5 mm.

Although it varies depending on the structure of the liquid leakage detection line, the material of the resin yarn to be used, and the like, examples of the liquid L include water; acidic solutions such as hydrochloric acid, sulfuric acid, nitric acid, phosphoric acid, and acetic acid; alkaline aqueous solutions such as ammonia and sodium hydroxide; and organic solvents such as methyl alcohol, ethyl alcohol, and acetone.

The braid 20 is formed of basalt fibers. The basalt fibers are inorganic fibers formed by extrusion spinning of melted basalt. Thus, the liquid leakage detection line 1 including the braid 20 formed of the basalt fibers has excellent flame retardancy, water resistance, and chemical resistance. For example, with respect to flame retardancy, the liquid leakage detection line 1 can conform to NFPA262 standards. Further, since the basalt fibers have excellent water absorption, the braid 20 can easily absorb water or a liquid containing water as well as a water-soluble organic solvent, as compared with a braid formed of glass fibers. Thus, the liquid leakage detection line 1 including such a braid 20 has high detection accuracy in particular for water.

The braid 20 is formed by braiding a basalt yarn formed of the basalt fibers twisted together. As compared with glass fibers, the basalt fibers have excellent scratch resistance, and are thus advantageous during braiding with a braiding machine. More specifically, the braiding machine generally includes, for example, a guide ring for guiding a yarn, and the guide ring rubs the yarn during braiding to cause a risk of damaging the fibers forming the yarn. Thus, the basalt fibers having excellent scratch resistance make it relatively easy to form a braid.

The glass yarn needs to be processed with a relatively large amount of a sizing agent to prevent the glass fibers from fraying. When such a glass yarn is used for forming a braid of a liquid leakage detection line, the sizing agent inhibits electrical connection of conductors, thereby reducing the detection accuracy. In contrast, according to the basalt fibers, the basalt yarn with the basalt fibers unlikely to fray can be formed without use of the sizing agent or by being subjected to treatment with a relatively small amount of the sizing agent. Therefore, the liquid leakage detection line 1 including the braid 20 formed of the basalt yarn has excellent detection accuracy.

As described above, the basalt yarn can be subjected to treatment with the sizing agent without reducing the detection accuracy of the liquid leakage detection line 1.

For the basalt yarn, it is preferable that an S-twisted yarn and a Z-twisted yarn be combined for use to prevent untwisting of portions of the yarns that are to be initially braided for forming the braid 20.

The number of strands in a spindle of the braid 20 is set to generally 1 to 10, preferably 1 to 3, and the number of spindles of the braid 20 is set to generally 3 to 32, preferably 4 to 24.

The support material 30 is formed by braiding a plurality of resin yarns 304 to form a plurality of openings 302 between the first electrode wire 11a and the second electrode wire 11b. In this embodiment, the support material 30 is formed of five resin yarns 304 that are twilled between the first electrode wire 11a and the second electrode wire 11b while being wound around the first electrode line 11a and the second electrode line 11b at certain intervals, so that the plurality of openings 302 are formed between the first electrode wire 11a and the second electrode wire 11b. With such a configuration, the liquid leakage detection line 1 allows the plurality of openings 302 continuously arranged between the first electrode wire 11a and the second electrode wire 11b to be closed by the liquid L, to thereby enable the first conductor 10a and the second conductor 10b to be electrically connected to each other.

Each of the resin yarns 304 preferably has water repellency. This configuration enables the liquid L that closes the plurality of openings 302 of the support material 30 to be easily removed with waste cloth or the like. That is, the resin yarn 304 having water repellency enables each of the conductors to easily return to an electrically unconnected state. In this regard, the resin yarn 304 is preferably a monofilament. In this case, the diameter of the resin yarn 304 is generally set to 0.1 to 0.5 mm.

The pitch of the resin yarn 304 forming the support material 30 is set to preferably 5 to 20 mm, more preferably 10 to 20 mm.

An opening area of each of the plurality of openings 302 can be appropriately changed depending on the kind of liquid L and the kind of resin forming the resin yarn 304, so as to enable the liquid L to close the opening 302. For example, the opening area can be adjusted using, as an indicator, the contact angle of the liquid L with respect to a resin material forming the resin yarn 304.

As the resin forming the resin yarn 304, preferable is polyphenylene sulfite (PPS), an ethylene-tetrafluoroethylene copolymer (ETFE), a tetrafluoroethylene-perfluoroalkoxy-ethylene copolymer resin (PFA), a tetrafluoroethylene-hexafluoropropylene copolymer (FEP), or the like.

Figure 3:
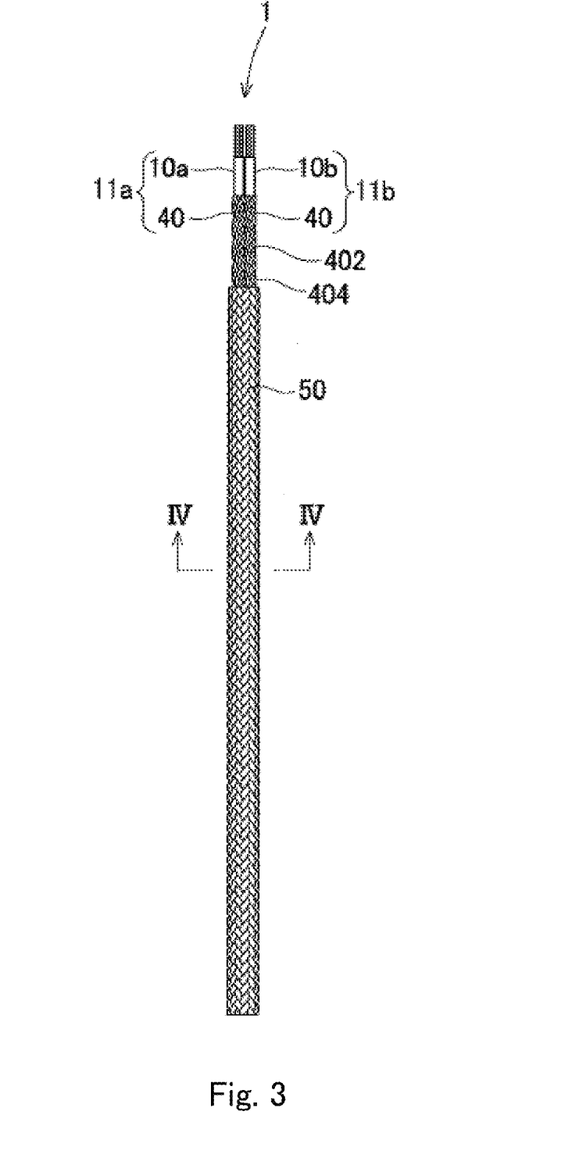
FIG. 3 is a plan view of a liquid leakage detection line according to a second embodiment.
Figure 4:
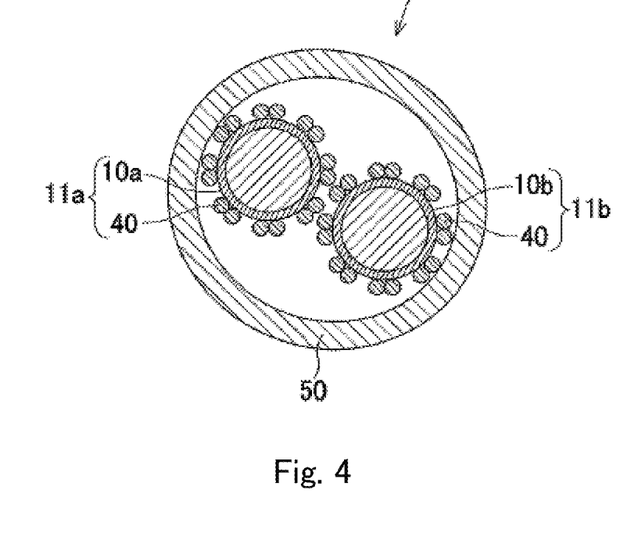
FIG. 4 is a sectional view of the liquid leakage detection line taken along line IV-IV in FIG. 3.

Next, a description will be given on a liquid leakage detection line 1 according to a second embodiment shown in FIG. 3 and FIG. 4. The same features as those of the first embodiment share the same reference signs, and the descriptions thereof will be omitted.

The liquid leakage detection line 1 according to this embodiment has both of a first conductor 10a and a second conductor 10b covered by a single braid 50, and further includes a covering material 40 that directly covers each of the first conductor 10a and the second conductor 10b. More specifically, the liquid leakage detection line 1 includes a first electrode wire 11a formed of the first conductor 10a covered by the covering material 40, and a second electrode wire 11b formed of the second conductor 10b covered by the covering material 40, and the first electrode wire 11a and the second electrode wire 11b are covered by the single braid 50 in a state of being in parallel with and in contact with each other. That is, the first electrode wire 11a and the second electrode wire 11b are covered together by the single braid 50. In this embodiment, the braid 50 is formed of basalt fibers. In other words, the first conductor 10a and the second conductor 10b each having the covering material 40 thereon are indirectly covered by the braid 50 formed of basalt fiber. Thus, the liquid leakage detection line 1 is configured to allow the liquid L to be absorbed by the braid 50 and to pass through the covering material 40, to thereby electrically connect the first conductor 10a and the second conductor 10b to each other through the liquid L.

In the liquid leakage detection line 1 of this embodiment, the electrode wires in contact with each other are covered by the single braid 50 to have these electrodes located close to each other, as described above, so that the liquid L can be easily retained around each of the electrodes. For example, the liquid leakage detection line 1 of this embodiment can be suitably used to directly detect liquid leakage from a vertical pipe and a horizontal pipe provided along a side face and a top or bottom face of a building. More specifically, the liquid leakage detection line 1 installed on such a pipe enables the liquid L to be retained around each of the conductors without being dropped, and thus suppresses a loss of the liquid L required for electrically connecting the conductors to each other. That is, the liquid leakage detection line 1 of this embodiment can exhibit excellent detection accuracy even when it is applied to such a pipe as aforementioned that easily causes drops of the liquid L.

The covering material 40 is formed of a resin yarn 404 braided to have a plurality of openings 402 through which each conductor is exposed. The covering material 40 is thereby configured to allow the liquid L to pass through the plurality of openings 402 to come into contact with each conductor.

In terms of allowing the liquid L to more reliably pass through the plurality of openings 402, the resin yarn 404 forming the covering material 40 is preferably a monofilament. In this case, the resin yarn 404 has a diameter generally set to 0.1 to 0.5 mm.

As the resin forming the resin yarn 404, used can be polyphenylene sulfite (PPS), an ethylene-tetrafluoroethylene copolymer (ETFE), a tetrafluoroethylene-perfluoroalkoxy-ethylene copolymer resin (PFA), a tetrafluoroethylene-hexafluoropropylene copolymer (FEP), or the like, and in terms of allowing the liquid L to more reliably pass through the plurality of openings 402, polyphenylene sulfite is preferable.

The number of strands in a spindle of the covering material 40 is preferably set to 1 to 3, and the number of spindles of the covering material 40 is preferably set to 4 to 24.

The pitch of the resin yarn 404 forming the covering material 40 is set to preferably 5 to 20 mm, more preferably 10 to 20 mm.

An opening area of each of the plurality of openings 402 can be appropriately changed depending on the kind of liquid L and the kind of resin forming the resin yarn 404, so as to enable the liquid L to pass through the opening 402. For example, the opening area can be adjusted using, as an indicator, the contact angle of the liquid L with respect to a resin material forming the resin yarn 404.

The braid 50 is formed of the basalt yarn forming the braid 20 in the first embodiment. The number of strands in a spindle of the braid 50 is preferably set to 1 to 3, and the number of spindles of the braid 50 is preferably set to 4 to 24.

Next, descriptions will be given on modified examples of the liquid leakage detection line 1 according to the second embodiment. In the liquid leakage detection line 1 as a modified example 1 shown in FIG. 5, the resistance value of either one (second conductor 10b) of the first conductor 10a and the second conductor 10b is set to be much higher than the resistance value of the other conductor (first conductor 10a). That is, the second conductor 10b is a resistance wire 10b. The resistance value of the resistance wire 10b is set to, for example, 10 to 11 Ω/m. As such a resistance wire 10b, for example, a nichrome wire can be used. When the first conductor 10a and the resistance wire 10b are electrically connected to each other through the liquid L, this configuration enables the measurement of voltage depending on the distance from the power supply to the location at which the conductors are connected to each other. This configuration further enables the identification of the location at which the conductors are connected to each other through the liquid L, and consequently facilitates the identification of the location at which liquid leakage occurs in a building or the like.

Figure 5:
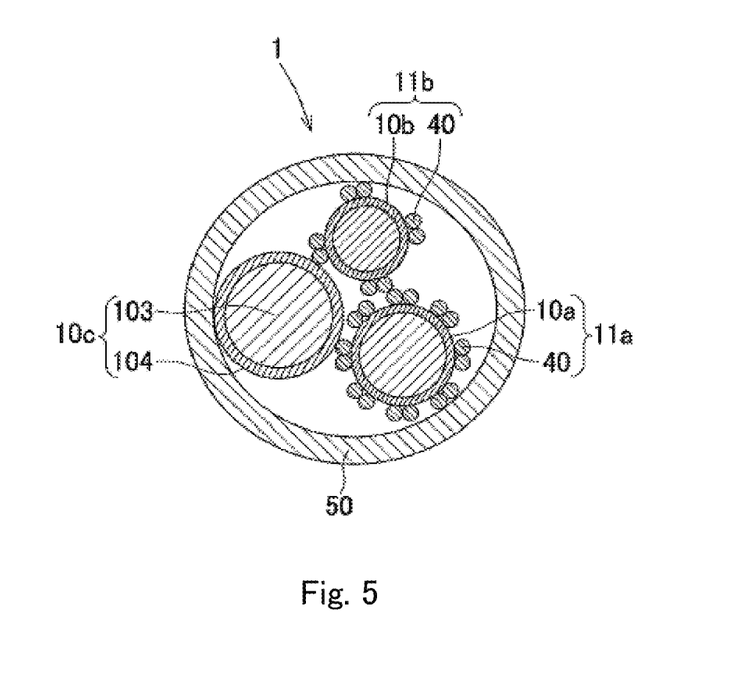
FIG. 5 is a sectional view of a liquid leakage detection line according to a modified example 1 of the second embodiment.

The resistance wire 10b has a wire diameter generally set to 0.35 to 0.45 mm.

The liquid leakage detection line 1 of the modified example 1 includes, as a third conductor 10c, a return wire 10c configured to be short-circuited with the conductor 10b forming the electrode wire 11b at a terminal end portion. In identifying the location at which liquid leakage occurs, an electric current flows through the conductor 10b. In this case, when no liquid L is present between the conductor 10a and the conductor 10b, no electric current flows through the conductor 10c as the conductors are insulated by the respective covering materials 40. In contrast, when the liquid L is present between the conductor 10a and the conductor 10b, an electric current flows from the conductor 10b to the conductor 10a, and flows to the conductor 10c through the terminal end portion, to thereby enable liquid leakage detection and the identification of the location at which liquid leakage occurs.

The return wire 10c is formed of a copper wire 103 having an insulating resin layer 104 on an outer side thereof. As a resin for forming the insulating resin layer 104, a fluorine-based resin is preferable. Examples of such a fluororesin include a tetrafluoroethylene-hexafluoropropylene copolymer (FEP), an ethylene-tetrafluoroethylene copolymer (ETFE), a tetrafluoroethylene-perfluoroalkoxyethylene copolymer resin (PFA), and a tetrafluoroethylene resin (PTFE).

Figure 6:
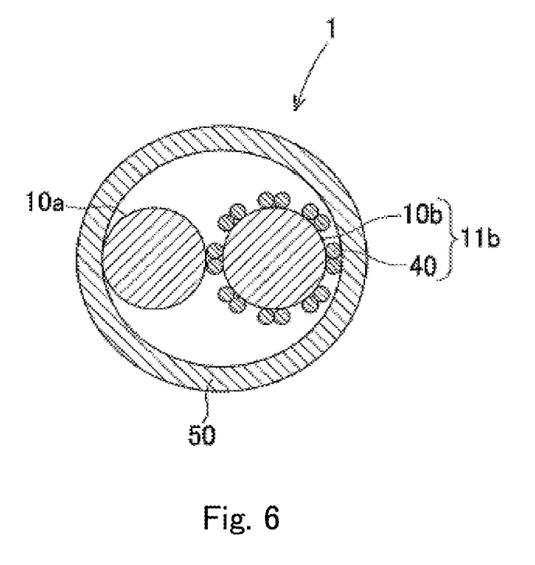
FIG. 6 is a sectional view of a liquid leakage detection line according to a modified example 2 of the second embodiment.

In the liquid leakage detection line 1 as a modified example 2 shown in FIG. 6, only one of the first conductor 10a and the second conductor 10b is covered by the covering material 40. Further, neither the first conductor 10a nor the second conductor 10b has the conductive resin layer 102. This configuration omits a step of covering one of the conductors with the covering material 40 in the production of the liquid leakage detection line 1, and relatively downsizes the liquid leakage detection line 1.

As described above, a liquid leakage detection line 1 according to this embodiment includes: at least two conductors 10 including a first conductor 10a and a second conductor 10b, in which the first conductor 10a and the second conductor 10b are configured to be electrically connected to each other through liquid L, and in which each of the first conductor 10a and the second conductor 10b is directly covered by a braid 20 including basalt fibers, or the first conductor 10a and the second conductor 10b are indirectly covered by a braid 50.

The basalt fibers are inorganic fibers formed by extrusion spinning of melted basalt. Thus, the liquid leakage detection line 1 has the conductors 10 each covered by the braid 20 including the basalt fibers or collectively covered by the braid 50, and has excellent flame retardancy. Since the basalt fibers are less likely to sting or prick the hands and fingers of workers than glass fibers, the liquid leakage detection line 1 has good construction workability.

It is preferable that the liquid leakage detection line 1 further include: a support material 30 supporting the first conductor 10a and the second conductor 10b, and that the first conductor 10a and the second conductor 10b be supported by the support material 30 so as to be disposed in parallel with each other with a clearance D therebetween.

Such a configuration in which the first conductor 10a and the second conductor 10b are supported by the support material 30 so as to be disposed with the clearance D therebetween suppresses erroneous detection.

The liquid leakage detection line 1 including the support material 30 is preferably configured such that the braid 20 includes a first braid 20 directly covering the first conductor 10a, and a second braid 10b directly covering the second conductor 20b, and that the first braid 20 and the second braid 20 are supported by the support material 30 so as to be disposed in parallel with each other with the clearance D therebetween.

Such a configuration in which the first conductor 10a and the second conductor 10b are directly covered respectively by the first braid 20 and the second braid 20, which are the braids including the basalt fibers, has excellent flame retardancy. Further, the configuration in which the first braid 20 and the second braid 20 are supported by the support material 30 so as to be in parallel with each other with the clearance D therebetween suppresses erroneous detection.

The liquid leakage detection line 1 is preferably configured such that both the first conductor 10a and the second conductor 10b are covered by the single braid 50, and that at least one of the first conductor 10a and the second conductor 10b is further covered by a covering material 40 through which the liquid L can pass.

Such a configuration in which both of the first conductor 10a and the second conductor 10b are covered by the single braid 50 and at least one of the first conductor 10a and the second conductor 10b is covered by the covering material 40 allows these conductors to be close to each other and thereby easily retain the liquid L therearound. This configuration can thus be applicable to, for example, a vertical pipe and a horizontal pipe provided along a side face or a top or bottom face of a building. That is, the above configuration can exhibit excellent detection accuracy even when it is applied to such a pipe as aforementioned that easily causes drops of the liquid L.

The liquid leakage detection line 1 including the covering material 40 is preferably configured such that one of the first conductor 10a and the second conductor 10b is not covered by the covering material 40.

Such a configuration in which one of the first conductor 10a or the second conductor 10b is not covered by the covering material 40 reduces the number of steps of producing the liquid leakage detection line 1, and relatively downsizes the liquid leakage detection line 1.

As described above, the embodiments have been shown as examples, but the liquid leakage detection line according to the present invention is not limited to the configurations of the aforementioned embodiments. The liquid leakage detection line according to the present invention is not limited by the aforementioned operational effects, either. Various modifications can be made to the liquid leakage detection line according to the present invention without departing from the gist of the present invention.

EXAMPLES

Hereinafter, the present invention will be further described by way of Examples.

Example 1

A conductive ETFE was used to form a conductive resin layer on an outer side of a copper wire that is formed by twisting tin plated annealed copper element wires and that has a cross-sectional area of 0.33 mm$^2$. Thus, two conductors were prepared. Using a braiding machine, a braid (number of strands in a spindle×number of spindles: 1×8, pitch: 16.0±2.0 mm) was formed with an S-twisted basalt yarn (BCY11.5-220KV12-S80, manufactured by JCK CO., LTD.) and a Z-twisted basalt yarn (BCY11.5-220KV12-Z80, manufactured by JCK CO., LTD.) to cover each of the conductors, so that two electrode wires were prepared. An ETFE monofilament (830-1-3190, diameter: 0.25 mm, manufactured by Toray Industries, Inc.) as a resin yarn was twilled between the respective electrode wires while being wound around these electrode wires so that the clearance D between the braids respectively forming the two electrode wires was 3.5±1.0 mm, so that a support material (number of strands in a spindle×number of spindles: 1×5, pitch: 10.0±2.0 mm) was formed. The obtained liquid leakage detection line had a width of 6.5±0.5 mm and a thickness of 2.0±0.4 mm.

Example 2

A conductive ETFE was used to form a conductive resin layer on an outer side of a copper wire that is formed by twisting tin plated annealed copper element wires and that has a cross-sectional area of 0.33 mm$^2$. Thus, a first conductor and a second conductor were prepared. Using a braiding machine, a covering material (number of strands in a spindle×number of spindles: 2×8, pitch: 12±3 mm) was formed with a PPS monofilament (diameter: 0.25 mm) to cover each of the conductors, so that the first electrode wire and the second electrode were prepared. With the first electrode wire and the second electrode wire in parallel with each other and in contact with each other, a braid (number of strands in a spindle×number of spindles: 1×12, pitch: 13±5 mm) was formed using a braiding machine and the basalt yarns used for Example 1 to cover all the electrode wires. The obtained liquid leakage detection line had a diameter of 4.0±0.5 mm.

Example 3

A conductive ETFE was used to form a conductive resin layer on a copper wire that is formed by twisting tin plated annealed copper element wires and that has a cross-sectional area of 0.33 mm². Thus, a first conductor was prepared. A conductive ETFE was used to form a conductive resin layer on a Kanthal D wire (diameter: 0.40 mm), so that a second conductor was prepared. Using a braiding machine and a PPS monofilament (diameter: 0.25 mm), a covering material (number of strands in a spindle×number of spindles: 2×8, pitch: 12±3 mm) was formed to cover the first conductor, and a covering material (number of strands in a spindle× number of spindles: 2×4, pitch: 11±3 mm) was formed to cover the second conductor, so that the first electrode wire and the second electrode were prepared. Further, a return wire (FEP wire, 0.5 sq) as a third conductor (FEP wire, 0.5 sq) was prepared. With the first electrode wire, the second electrode wire, and the return wire in parallel with each other and in contact with each other, a braid (number of strands in a spindle×number of spindles: 1×12, pitch: 13±5 mm) was formed using a braiding machine and the basalt yarns used for Example 1 to cover all of the two electrode wires and the return wire. The obtained liquid leakage detection line had a diameter of 3.5±0.5 mm.

Evaluation Method 1

The following testing equipment was used to observe the detection performance of each of the liquid leakage detection lines. For Example 1, about 100 μS/cm water was dropped onto the liquid leakage detection line at a rate of 0.05 mL/sec to measure a wet width of the liquid leakage detection line and the number of drops of water at the time when the conductors were electrically connected to each other through water. This measurement was performed 10 times to calculate the average values respectively of the wet width and the number of drops. As an evaluation standard, the liquid leakage detection line having the average wet width of 100 mm or less was evaluated as being excellent in detection performance. Examples 2 and 3 were also tested in the same manner as in Example 1. As an evaluation standard of Examples 2 and 3, the liquid leakage detection line was evaluated as being excellent in detection performance when the amount of dropped water was 3.0 mL (corresponding to 60 droplets) or less.

Testing Equipment

Water leakage detector: AD-AS-1AM (detection sensitivity of 50 kΩ, terminal connected at 82 kM), manufactured by TATSUTA Multi-parameter water quality checker (conductivity meter): WA-2017SD manufactured by SATOTECH Microreactor (drop speed regulator): YSP-201 manufactured by YMC Tester: DT4281 manufactured by HIOKI Metal ruler (for measuring wet width): CN9510 manufactured by Shinwa Evaluation Method 2

Each of the liquid leakage detection lines was cut at a given position to evaluate whether 10 test subjects touching the cut portion with their fingers felt any irritating sensation such as itchiness or pain, based on the following evaluation standard:

(Evaluation Standard)

When 5 or more out of 10 test subjects did not feel itchiness or pain, such a liquid leakage detection line was evaluated as having good construction workability.

Figure 7:
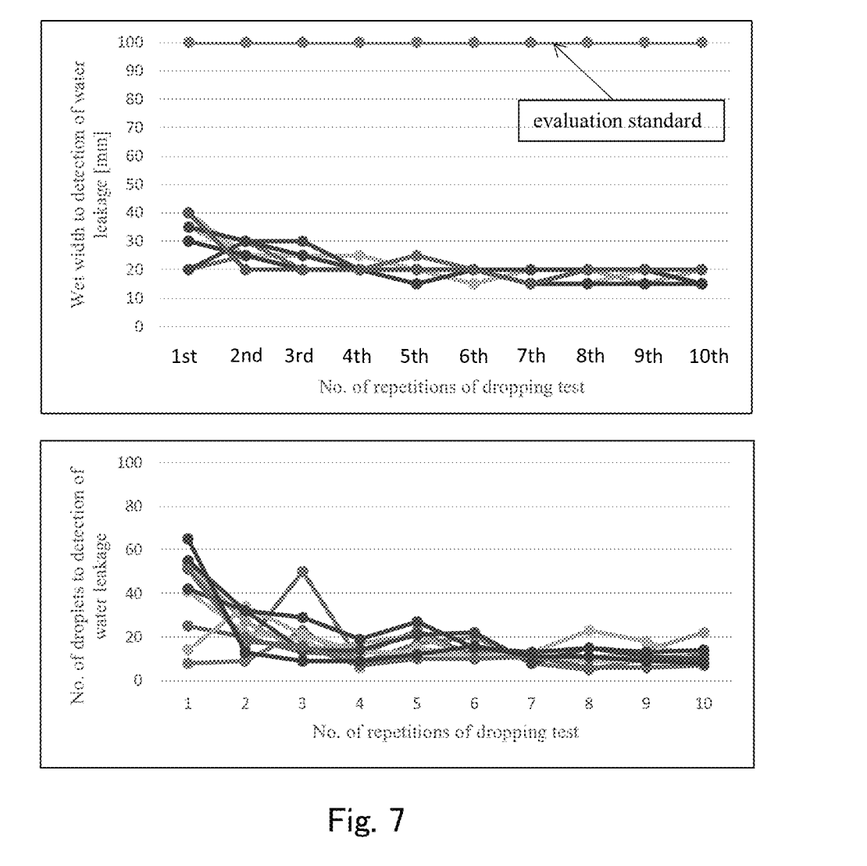
FIG. 7 shows graphs showing the detection performance of a liquid leakage detection line of Example 1.
Figure 8:
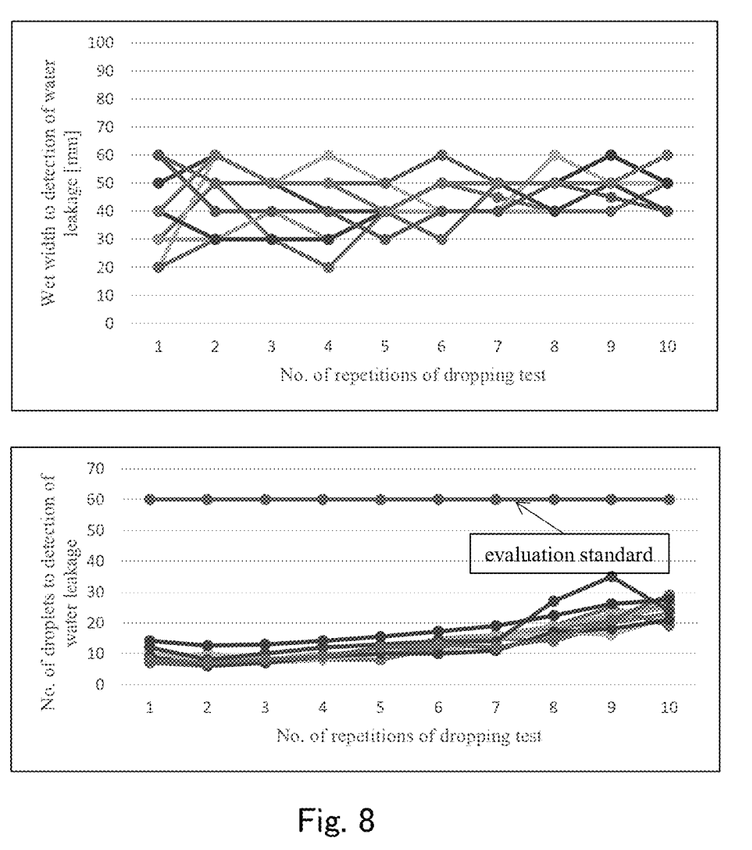
FIG. 8 shows graphs showing the detection performance of a liquid leakage detection line of Example 2.
Figure 9:
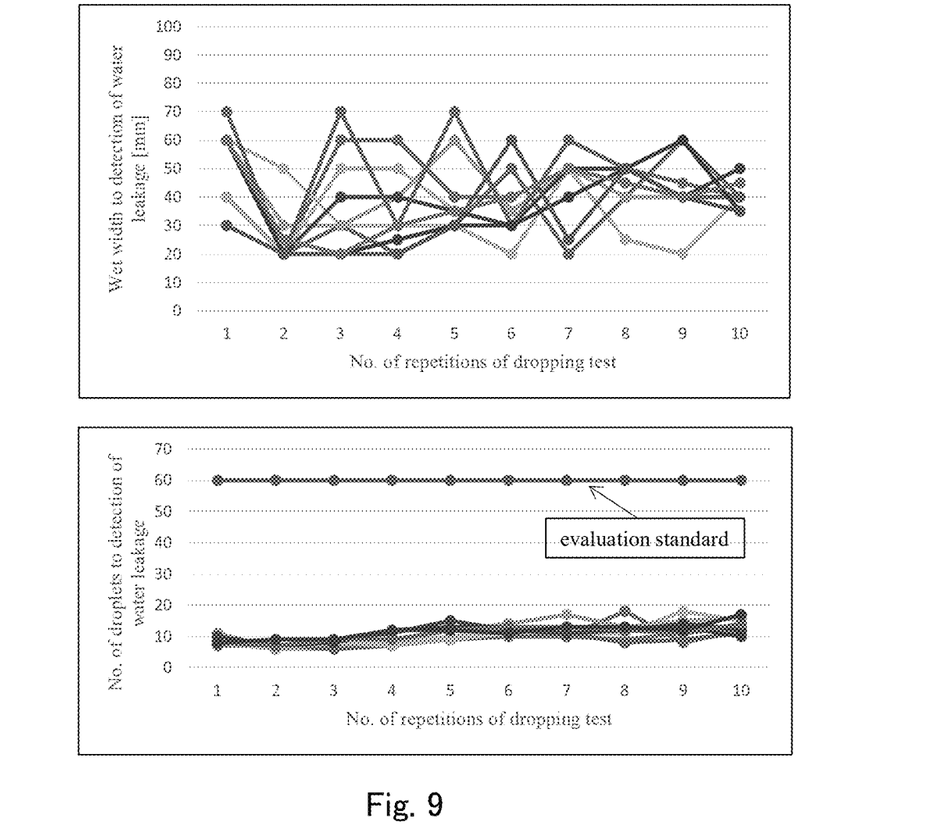
FIG. 9 shows graphs showing the detection performance of a liquid leakage detection line of Example 3.

The liquid leakage detection line of each of Examples 1 to 3 has the conductors directly or indirectly covered by the braid(s) formed of basalt fibers, and thus has excellent flame retardancy, water resistance, and chemical resistance. As shown in Table 1 and FIGS. 7 to 9, the liquid leakage detection line of each of Examples 1 to 3 is found to satisfy the above evaluation standard and have excellent detection accuracy. Further, the liquid leakage detection line of each of Examples 1 to 3 is found to have good construction workability since 7 out of 10 test subjects did not feel itchiness or pain.

TABLE 1

| Evaluation | Wet width (mm) | | | Amount of water (mL) | | |
|---|---|---|---|---|---|---|
| method 1 | Min. | Max. | Ave. | Min. | Max. | Ave. |
| Ex. 1 | 15 | 40 | 21.4 | 5.0 | 65.0 | 17.1 |
| Ex. 2 | 20 | 60 | 45.2 | 0.30 | 1.75 | 0.70 |
| Ex. 3 | 20 | 70 | 40.1 | 0.30 | 0.90 | 0.52 |

REFERENCE SIGNS LIST

1: Liquid leakage detection line
10: Conductor
101: Copper wire
103: Copper wire
102: Conductive resin layer
104: Insulating resin layer
20: Braid
30: Support material
302: Opening
304: Resin yarn
40: Covering material
402: Opening
404: Resin yarn
50: Braid
D: Clearance

The invention claimed is:

1. A liquid leakage detector comprising:
at least two conductors comprising a first conductor and a second conductor,
wherein the first conductor and the second conductor are configured to be electrically connected to each other through a liquid, and
wherein the first conductor and the second conductor are each directly covered by a braid comprising basalt fibers to respectively form a first electrode wire and a second electrode wire, the liquid leakage detector further comprising a support material supporting the first electrode wire and the second electrode wire, wherein the first electrode wire and the second electrode wire are supported by the support material so as to be disposed in parallel with each other with a clearance therebetween, wherein the support material is formed into a net shape by braiding a water-repellant resin yarn, and wherein the resin yarn has a pitch of 5 mm to 20 mm.

2. A liquid leakage detector comprising:

at least two conductors comprising a first conductor and a second conductor, wherein the first conductor and the second conductor are configured to be electrically connected to each other through a liquid, wherein both of the first conductor and the second conductor are covered by a single braid comprising basalt fibers, wherein at least one of the first conductor and the second conductor is further covered by a covering material through which the liquid can pass, wherein the covering material is formed into a net shape by braiding a water-repellent resin yarn, wherein the resin yarn is disposed to lay between the first conductor and the second conductor, wherein the resin yarn has a pitch of 5 mm to 20 mm, and wherein the resin yarn is made of polyphenylene sulfite, an ethylene-tetrafluoroethylene copolymer, a tetrafluoroethylene-perfluoroalkoxyethylene copolymer resin, or a tetrafluoroethylene-hexafluoropropylene copolymer.

3. The liquid leakage detector according to claim 2, wherein one of the first conductor and the second conductor is not covered by the covering material.

* * * * *